Sept. 18, 1962

H. HELPA 3,054,145

METHOD OF MANUFACTURING NUTS AND MOLD FOR
USE IN MANUFACTURING THE NUTS

Filed May 29, 1957

INVENTOR.

HANNS HELPA

BY

United States Patent Office 3,054,145
Patented Sept. 18, 1962

3,054,145
METHOD OF MANUFACTURING NUTS AND MOLD FOR USE IN MANUFACTURING THE NUTS
Hanns Helpa, Vienna, Austria, assignor to Hubert Laurenz Naimer, Vienna, Austria
Filed May 29, 1957, Ser. No. 662,424
Claims priority, application Austria June 8, 1956
4 Claims. (Cl. 18—42)

Nuts consist in most cases of integral bodies having a thread which is either machined into a blank or where the nut consists of plastics, molded around a threaded core. The first method has the disadvantage that the manufacture is time-consuming and requires tools which are subjected to wear whereas, in the second case, the finished nut must be unscrewed from the threaded mandrel in a time-consuming operation.

Numerous proposals have already been disclosed for manufacturing a nut by assembling two or more loose parts, each of which carries part of the thread of the nut; these parts are then held together either by inserting them in a holding ring or the like or by means of connecting members.

All previously disclosed nuts of this type have the important disadvantage that the assembly of their individual loose parts to form a nut ready for use is very complicated; moreover, most of the nuts of this type have the disadvantage that additional elements are required for connecting the parts.

The present invention relates also to a nut which consists of at least two parts which complement each other to form a complete nut and provides a method whereby nuts of this type may be manufactured in a novel and labor saving manner. The invention provides also a novel implement for use in the manufacture of nuts.

The method according to the invention serves for the manufacture of nuts which comprises two or more interconnected parts, each of which carries a part of the thread of the nut and which can be folded about the center of their connection into a position in which the thread parts complement each other to form the complete nut. In accordance with this invention, an annular nut with an internally threaded surface is produced by casting or injection-molding a liquid mass of a thermoplastic synthetic resin into a cavity defined by two mold surfaces, one of said mold surfaces being substantially smooth to define the outer surface of the nut parts and the other mold surface including thread portions to form the internally threaded surface, the mold cavity consisting of a plurality of portions for each nut part and a narrow channel interconnecting the cavity portions to form a flexible web between the nut parts, permitting the liquid mass to harden in the mold cavity, separating the internally threaded nut parts from the thread portions of said other mold surface by lifting the same substantially perpendicularly off said other mold surface thread portions, and bending the internally threaded nut parts about their connecting webs to form the annular nut with its threaded parts pointing inwardly and complementing each other to form a continuous helix. Thus a nut which is an integral workpiece and which can be brought by a simple bending operation into its operative position, is obtained in a very simple manner and, as will be shown hereinafter, with a very simple mold.

According to a preferred embodiment the nut according to the invention comprises two parts and the connecting web is arranged on the outside periphery of the nut. Such a nut can be manufactured in a particularly simple manner, as is apparent from the following description of some illustrative embodiments with reference to the accompanying drawings.

In these drawings, FIG. 1 shows the embodiment of the nut just referred to and FIG. 2 a (die-casting or injection mold) for its manufacture.

FIG. 6 is a sectional elevation of the mold taken on line VI—VI of FIG. 7, FIG. 7 is a top plan view showing the mold with the mold top removed and FIG. 8 is an elevation showing the mold, also with its top removed.

Figure 1:
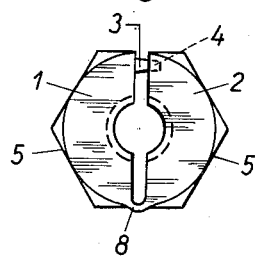

The nut according to FIG. 1 consists of two halves 1, 2, which are held in their correct relative position by locating dowels 3 fitting dowel holes 4. 8 is a web which connects the two halves 1, 2 of the nut and is integral therewith. Since the nut halves 1, 2 consist of synthetic thermoplastic material, they may be heat-sealed to each other adjacent to the dowel 3. Such a nut may also be used without having its halves heat-sealed to each other if the halves of the nut have a slightly tapered outer periphery 5, which fits a mating recess in the element of construction (not shown), against which the nut is forced when it has been tightened.

Figure 2:
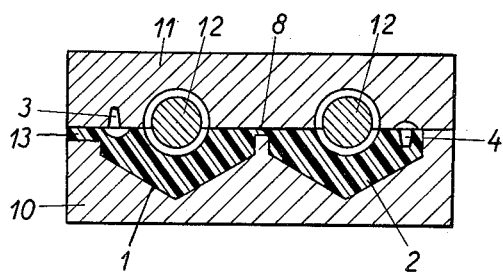

FIG. 2 shows an injection mold which is suitable for the manufacture of such nuts. The two halves 1, 2 of the nut are made in the mold base 10; the mold top 11 carries threaded cores 12, which extend only in one half of the mold cavity. Base 10 and top 11 constitute two separable mold parts defining a mold cavity portion for each half of the nut, the two cavity portions being in communication through a narrow channel extending along the molding surface of top 11 symmetrically between the molding members 12, 12. The drawing shows also the connecting web 8, the dowel 3 and the dowel hole 4, as well as the runner 13 through which the liquid synthetic resin mass is injected.

It will be readily seen that the nut of FIG. 1 may easily be bent into its closed form after it has been removed from the mold 10, 11. This can be achieved by lifting the mold halves apart and then removing the molded article without any necessity of driving the threaded surfaces of the nut along the threaded molding surfaces in a time-consuming operation. In a nut thus obtained the thread parts of the two halves of the nut will properly complement each other if one of the cores 12 is suitably staggered axially relative to the other, which can easily be achieved.

Figure 3:
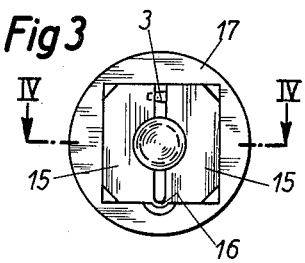
FIG. 3 is a top plan view showing another embodiment.
Figures 4, 7:
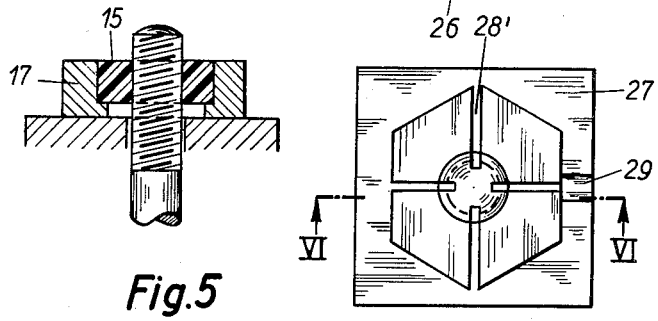
FIG. 4 is a sectional elevation of the nut shown in FIG. 3.

FIGS. 3 and 4 illustrate a nut generally similar to that of FIG. 1 and having two halves 15, 15 and a connecting web 16, with the dowels 3. In order to hold the halves 15, 15 of the nut in their operative position they are inserted in a profiled ring 17, which in the example shown has a cylindrical outside periphery but could also have a square, hexagonal or other external shape usual in connection with nuts. Such rings for composite nuts are known.

Figure 5:
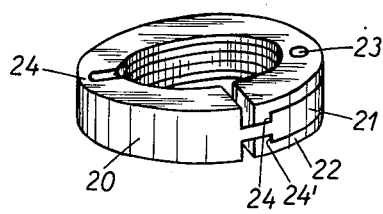
FIG. 5 shows another embodiment.

The embodiment shown in FIG. 5 represents a folding nut which is similar to the one shown in FIG. 1 after it has been folded together. One half 20 of the nut is formed with one lug 21; the other half of the nut is formed with two lugs 22. These lugs interengage and are fixed to each other by a transverse bolt 23. The connecting web for the two nut halves 20 is indicated at 24. Because in this case the lugs 21, 22 overlap, the peripheral angle of each thread-carrying part exceeds 180°, different from the embodiments shown in FIGS. 1 and 3 where said angle is equal to or slightly less than 180°. For this reason the pulling of the halves of the nut from the threaded cores requires that the halves of the nut are slightly expanded but this will not involve any difficulty if moderately deformable materials are used. To improve the connection between the two halves of the nut, the lugs 21, 22 may be formed with interlocking recesses and projections 24'. Such locking means are known per se in nuts consisting of two separate parts.

Figures 6, 8:
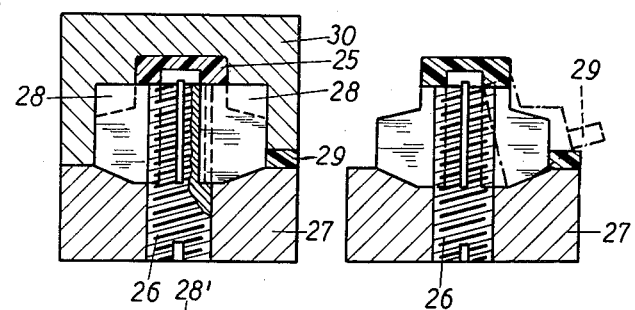
FIGS. 6, 7 and 8 show the manufacture of another form of the nut according to the invention in an injection mold. Specifically.

FIGS. 6–8 illustrate another embodiment of an injection mold for making a nut. As shown, this mold also comprises two separable mold parts 27 and 30, the top mold part 30 carrying radially extending partitions 28 defining a plurality of like cavity portions arranged adjacent each other and forming an annulus. The base mold part 27 has fitted thereinto a substantially circular threaded molding member or mold core 26 which extends centrally between the cavity portions from the molding surface of mold part 27. As may be clearly seen in FIG. 6, a narrow space is left between the top of the threaded molding member 26 and the top mold part 30 so that a plastic web 25 forming an end wall of the nut may be formed when plastic is injected through runner 29. Also, an annular space is left between the partitions 28 and the core 26 so that the cavity portions may intercommunicate and be in communication with circular space 25. After the injected liquid plastic has solidified in the mold cavity around threaded core 26, the top mold part 30 is removed (see FIG. 8), leaving a nut consisting of four nut parts (corresponding to the four cavity portions shown in FIG. 7), the nut parts being separated partially by channels 28'. As shown in dash-and-dot lines in FIG. 8, each of the nut parts may be flexed outwardly about the annular web connecting the end wall 25 to the nut parts to permit the nut to be pulled upwardly from the core 26. Thereafter the parts of the nut are returned to their correct position, the projection 29 is removed and the nut is used according to the principle which has been explained with reference to FIG. 1 or is provided with a ring as shown in FIG. 3.

The manufacturing process of this invention always involves some deformation of the nut part connecting webs. A material which permits of such deformation and which has at the same time a strength which is suitable for a great many applications is provided by a plastic which is available at the present time in the form of polyamides or superpolyamides. Nuts of this material have a surprisingly high load-carrying capacity; since these plastics are thermoplastic the nuts can be injection-molded in a simple manner in multiple molds. It is emphasized, however, that the invention is by no means restricted to the use of the plastics just referred to.

It has also been found that it is suitable to leave mold burrs at those points of the nuts where the separating channels between the nut parts (such as 28' in FIG 7) pass over into the threads or extend into the thread profile. Such burrs will be automatically formed in the molding of synthetic thermoplastics. When the bolt is screwed into the nut, these burrs will interlock with the thread of the bolt whereby the nut is secured against any undesired loosening. It is obvious that these burrs may also be intentionally formed at other points though this is not necessary because they will result more or less automatically and in a convenient manner at a suitable point due to the construction of the mold.

The great advantages of the nuts according to the invention relate mainly to the manufacture thereof because the use of casting dies or molds as are shown diagrammatically and by way of example in FIG. 2 will simplify the manufacture of the nuts to make it as simple as the molding of a threadless mass-produced article. In principle, such a mold is designed so that the mold part having the thread-shaping molding surfaces, i.e. the cores 12 of FIG 2, the core 26 of FIGS. 6 and 8, or the bolts 32 of FIG. 10, may be separated from the other mold part without driving it along the screw threads. Previously, the manufacture of nuts by injection molding has been time-consuming, because the finished nut had to be unscrewed from the core. Also, the fact that the parts of the nut are interconnected avoids or greatly simplifies any subsequent assembling work which is required with loose parts.

This is a continuation-in-part of Serial No. 653,794 filed on April 19, 1957.

I claim:

1. A method of manufacturing a nut comprising at least two internally threaded nut parts integrally interconnected by a flexible web, comprising the steps of injection-molding a liquid mass of a thermoplastic synthetic resin in a cavity defined by two separable mold surfaces, one of said mold surfaces being substantially smooth to define the outer surface of the nut parts and the other mold surface including thread portions to form the internal threads of the nut parts, the mold cavity consisting of a portion for each nut part and a narrow channel interconnecting the cavity portions to form the flexible web interconnecting the nut parts, permitting the liquid mass to harden in the mold cavity, separating the internally threaded nut parts from the thread portions of said other mold surface in a direction substantially perpendicular to said thread portions, and bending the internally threaded nut parts about their connecting webs to form the annular nut with internal threads forming a continuous helix.

2. The nut manufacturing method of claim 1, wherein said connecting webs are bent to separate the internally threaded nut parts from the thread portions of said other mold surface.

3. An injection mold comprising two separable mold parts, one of said mold parts defining two like cavity portions arranged adjacent each other and the other one of said mold parts having a flat molding surface facing said cavity portions, a substantially semicircular threaded molding member extending from said molding surface substantially centrally into each of said cavity portions, whereby each of said cavity portions assumes a substantially semi-annular cross section, the cavity portions intercommunicating through a narrow channel extending along said molding surface symmetrically between said molding members and an injection molding orifice leading into one of said cavity portions.

4. An injection mold comprising two separable mold parts having a plurality of partitions, one of said mold parts defining a plurality of like cavity portions arranged adjacent each other, all cavity portions forming an annulus, and the other one of said mold parts having a molding surface facing said cavity portions, a substantially circular threaded molding member extending from said molding surface substantially centrally between said cavity portions toward said one mold part but leaving a narrow circular space between the molding member and the one mold part, the molding member and the partitions defining an annular space in communication with said circular space and said cavity portions, and an injection molding orifice leading into one of said cavity portions.

(References on following page)

References Cited in the file of this patent

UNITED STATES PATENTS

| | | | |
|---|---|---|---|
| 1,585,627 | O'Brien | May 18, | 1926 |
| 1,607,873 | Crowder | Nov. 23, | 1926 |
| 1,693,315 | Penfold | Nov. 27, | 1928 |
| 1,929,164 | Eden | Oct. 3, | 1933 |
| 2,277,599 | McGinnis | Mar. 24, | 1942 |
| 2,327,665 | Peat | Aug. 24, | 1943 |
| 2,441,580 | Mageoch | May 18, | 1948 |
| 2,570,433 | Dodge | Oct. 9, | 1951 |
| 2,607,935 | Archer | Aug. 26, | 1952 |
| 2,615,203 | Du Pree | Oct. 28, | 1952 |
| 2,683,899 | Reichenbach | July 20, | 1954 |
| 2,875,472 | Marcus | Mar. 3, | 1959 |

FOREIGN PATENTS

| | | | |
|---|---|---|---|
| 1,039,555 | France | Oct. 8, | 1953 |
| 62,145 | France | Dec. 29, | 1954 |

(2nd addition to No. 1,039,555)